Oct. 11, 1966  H. ROSENBAUM  3,278,184
WEIGHTED TRAINING ANKLET
Filed Dec. 30, 1963
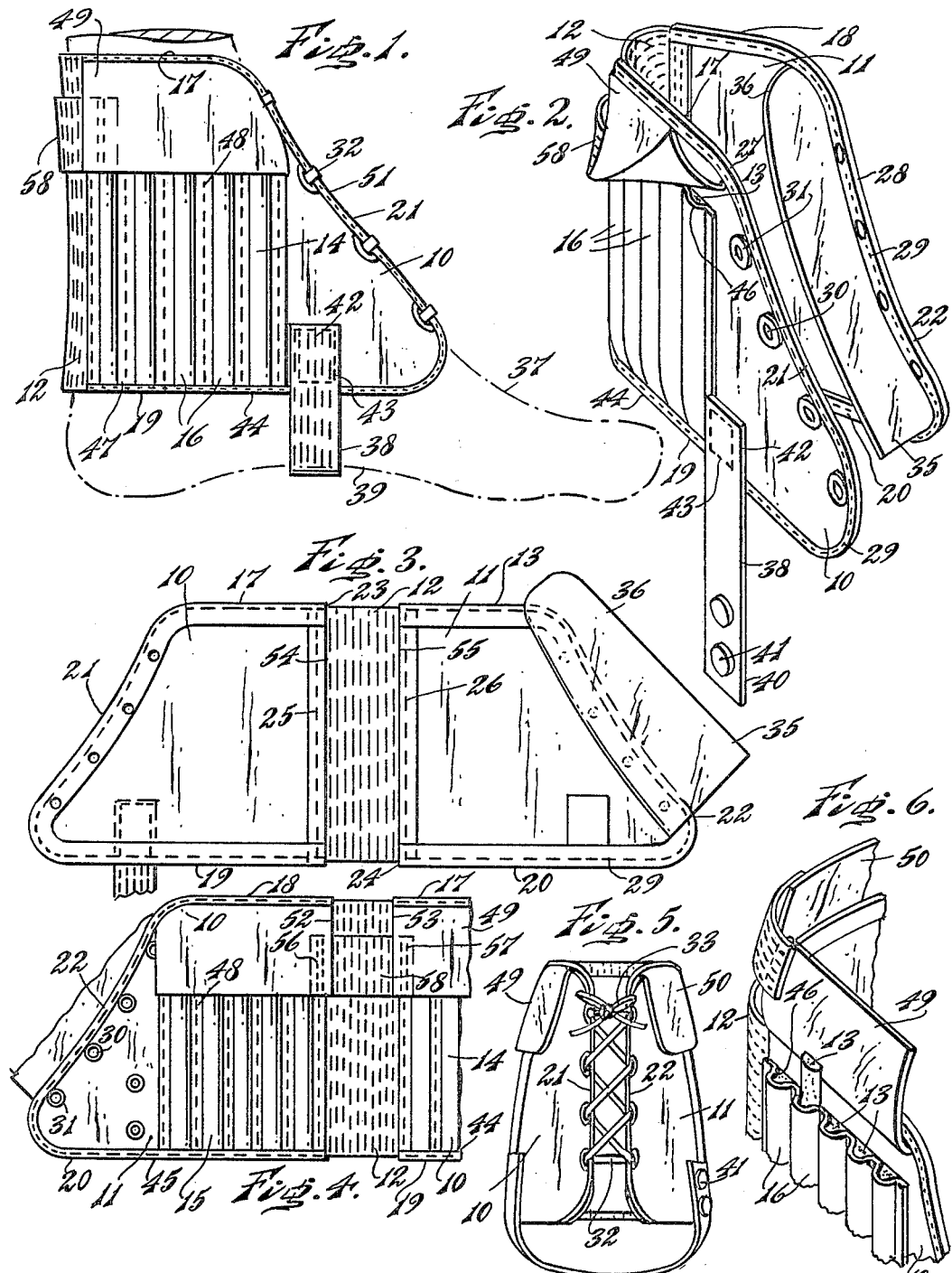
INVENTOR
Harold Rosenbaum
BY Karl L. Spivak
ATTORNEY

United States Patent Office 3,278,184
Patented Oct. 11, 1966

3,278,184
WEIGHTED TRAINING ANKLET
Harold Rosenbaum, 416 N. 3rd St., Philadelphia, Pa.
Filed Dec. 30, 1963, Ser. No. 334,538
2 Claims. (Cl. 272—57)

This invention relates generally to the field of athletic training aids and more particularly to a device especially designed for use by track and field athletes in high school, college and other amateur sport training programs.

The instant invention comprises an ankle covering receptacle providing a number of vertical pockets each designed to carry a removable weight. As in the sport of baseball it is a common occurrence to see a prospective batter practice by swinging two or three bats, the same effect may be gained by track and field athletes and athletes engaged in similar running activities through the use of the instant invention. By wearing the device during training sessions, the athlete will be able to strengthen his muscles in order to carry the additional weight. As the training progresses, more and more weights may be added to the anklet, depending upon the physical improvement of the user. In such a manner, the muscles of the athlete can be trained to permit the user to run and jump even under the handicap of the additional weight. It is apparent then, that at the time of the actual game, contest or meet for which purpose the training sessions were held, when the anket is not used, the muscles trained to carry the additional burden will respond with greater vigor enabling the athlete to put forth his best possible effort.

Weighted training aids have been previously used in varying forms and some have included the idea of a plurality of removable weights. However, prior art devices have all suffered from a common deficiency due to difficulty in fitting the device to the body of the user. Further, prior art training aids offered difficulty in varying the number of weights actually utilized and provided no positive method of locking weights in the desired position.

It is therefore an object of this invention to provide a weighted training aid featuring an elasticized, ankle encircling web adapted to provide a universal fit to all sizes.

It is another object of this invention to provide a weighted training aid incorporating a plurality of weight enclosing pockets.

It is another object this invention to provide a weighted training aid featuring a positive weight locking arrangement whereby a weight cannot accidently shake loose while in use.

It is another object of this invention to provide a weighted training aid of pliable and resilient body construction.

It is another object of this invention to provide a weighted training aid incorporating features permitting easy installation and removal of the device.

It is another object of this invention to provide a weighted training aid incorporating features to assure the comfort of the user while being worn.

It is another object of this invention to provide a weighted training aid of unique construction permitting adding or removal of weights while the device is being worn.

It is another object of this invention to provide a weighted training aid that is simple in construction, inexpensive in manufacture and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a side elevational view of a weighted anklet constructed in accordance with this invention.

FIG. 2 is a front perspective view of the invention.
FIG. 3 is a front layout view of the invention.
FIG. 4 is a partial rear layout view of the invention.
FIG. 5 is a front elevational view of the invention.
FIG. 6 is a partial rear perspective view of the invention.

Although specific terms are used in the following description for the sake of clarity these terms are intended to refer only to the particular structure of my invention selected for illustration in the drawings and are not intended to define or limit the scope of the invention.

Referring now to the drawings, it will be seen that the invention consists of an ankle encircling exercising device comprising principally a pair of side carriers 10, 11 joined in back to back relation by a resilient web 12 providing a wide range of size adjustment. A plurality of vertical pockets 16 for containing weights 13 are formed exteriorly of side carriers 10, 11 utilizing flexible walls 15, 14 divided by appropriate stitching.

As seen in FIGS. 2 and 3, side carriers 10, 11 may be formed of flexible leather or heavy fabric having horizontal, parallel top edges 17, 18 and bottom edges 19, 20 each joined respectively by forwardly inclined lacing edges 21, 22. Respective rear edges 23, 24 of carriers 10, 11 are joined by a rectangular strip of strong elastic fabric stitched continuously along vertical seams 25, 26. Top edges 17, 18, bottom edges 19, 20 and inclined edges 21, 22 are respectively reinforced by continuous leather or plastic binding strips 27, 28 secured by continuous stitching 29.

A plurality of spaced lacing holes 30 suitably reinforced with metal or hard plastic grommets 31 are punched along inclined edges 21, 22 to receive laces 32 which are tied in a bow 33 in the usual manner to firmly affix the training device about the ankle 34 of the wearer. Tongue 35 joins inside of inclined edge 22 along substantially its entire length and is affixed beneath binding strip 28 by stitching 29 which at this edge serves the common purpose of attaching binding strip as well as securing tongue. In use, free end 36 is placed across front of foot 37 of the user beneath inclined edge 21 of opposite side carrier 10 to permit ready adjustment of the device upon tightening laces 32 to the comfort of the wearer.

Arch strap 38 depends from bottom of right side carrier a sufficient length to pass under arch 39 of the foot of the wearer and free end 40 attaches to bottom of left side carrier 11 by two piece snap fastener 41 in the usual manner. Complete adjustability is provided by constructing strap 38 of resilient, elastic material and by providing two or more pairs of spaced snap fasteners whereby the free length of strap may be readily modified. Fixed end 42 of strap 38 is secured to right side carrier 10 by permanent stitching 43 while snap fasteners 41 are pressed into position in the usual manner.

Right and left flexible walls 14, 15 respectively attach to exterior of right and left side carriers and have closed bottom edges 45, 44 coincident with bottom edges 19, 20 and affixed thereto by common binding strips 27, 28 and stitching 29. A plurality of vertical pockets 16 are formed between flexible walls 14, 15 and side carriers 10, 11 with top 46 open to receive weights 13 and bottom 47 closed by binding strips 27, 28 and stitching 29 to contain weights 13. Vertical stitching 48 secures respective adjacent carriers 10, 11, and flexible walls 14, 15 and divides flexible walls into pockets 16. Material of right and left walls 14, 15 may be gathered as required at bottom 19 and between pockets 16 prior to stitching to shape pockets to size required to accommodate weights 13.

Top closing flaps 49, 50 depend from top edges 17, 18 and are secured thereto under binding strips 27, 28 by common stitching 29. Flaps 49, 50 may be of leather, fabric or other strong, flexible material and depend a distance sufficient to cover open top of pockets 46 thereby preventing weights 13 from being accidently removed. Flaps extend rearwardly from inclined edges 21, 22 leaving sufficient space at front 51 of anklet to permit convenient tying of laces 32. Rear edges 52, 53 of flaps 49, 50 terminate coincidently with rear edges 54, 55 of carriers 10, 11 and are joined by resilient band 58 secured by vertical stitching 56, 57 near edges 52, 53. Flaps 49, 50 attach exteriorly of carriers 10, 11 thereby permitting raising or lowering while the device is being worn. It is thus seen that weights may be either added or removed as desired simply by raising flaps 49, 50, making the desired adjustment and then lowering the flaps. It is not required to remove the weighted anklet from the foot of the user in order to accomplish the weight adjustment.

In order to use the invention, a pair of weighted anklets constructed in accordance with the foregoing, is utilized by attaching one device to each ankle. The laces 32 and resilient web 12 provide a wide range of adjustment, thereby permitting a single size to be universally adaptable for use by athletes of various sizes. Arch strap 38 fits under the arch of the wearer and free end 40 is secured by snap fastener 41 for a comfortable fit. By providing a plurality of snap fasteners, a wide range of adjustment of the length of arch strap may be readily accomplished. One or more weights 13 may be inserted into open end 46 of pockets 16 by raising flaps 49, 50, pushing lead or other weight entirely into pocket and then lowering the flap. It is preferable to use the same number of weights at each ankle, and as the training progresses, an increasing number of weights may be utilized until all pockets are brought into service. With the weighted anklet in place, resilient band 58 acts to pull flaps 49, 50 together, adhering to walls 14, 15 and covering open tops 46 of pockets 16, thereby preventing accidental release of any weight 13.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. In an anklet encircling athletic training aid, the combination of a pair of right and left side carriers, the inside of the said carriers respectively contacting the right and left side of the wearer's ankle, said carriers terminating forwardly in inclined lacing edges and terminating respectively rearwardly in vertical, spaced ends; a vertical strip of elasticized webbing joining the said rearward vertical edges of the side carriers, said webbing extending the entire height of the side carriers and being respectively secured to the said ends by vertical stitching; an adjustable transverse arch strap joining the said carriers intermediate their said forward and rearward edges, said strap being constructed of yieldable material and said strap being provided with length varying means; right and left pocket walls respectively overlying a portion of the said side carriers and being secured thereto along the bottom edges by horizontal stitches, the said walls being further attached to the said carriers intermittently by a plurality of spaced, vertical stitches to form a plurality of equal vertical pockets, said pockets having closed bottoms and open tops; a pair of hingedly attached flaps depending respectively from the tops of the said side carriers and being secured thereto by horizontal stitching, the said flaps depending from the tops a distance sufficient to overly the said open tops of the said pockets and the said flaps each being of a length equal to the said right and left pocket walls, and said flaps respectively overlying the said pocket walls; and a strip of yieldable material rearwardly joining the said flaps, the latter said material being in unstretched condition when the said flaps cover the tops of the said pockets and the said material being stretched when the said flaps are hingedly pivoted about their said top connections to expose the tops of the said pockets.

2. The invention of claim 1 wherein the said yieldable material joining the said flaps overlies the said webbing joining the said side carriers when the said flaps are in their pocket covering position.

References Cited by the Examiner

UNITED STATES PATENTS

| | | | |
|---|---|---|---|
| 1,606,862 | 11/1926 | Zenishek | 36—2 |
| 1,685,991 | 10/1928 | Erickson | 36—2 |
| 2,021,189 | 11/1935 | McClure | 36—2 |
| 2,214,052 | 9/1940 | Good | 272—57.1 |
| 2,241,833 | 5/1941 | Waller | 272—57 |

RICHARD C. PINKHAM, *Primary Examiner.*

L. J. BOVASSO, *Assistant Examiner.*